March 18, 1924.

N. D. GIGLIOTTI 1,487,378

MACHINE FOR MAKING NOODLES, MACARONI, AND SPAGHETTI

Filed Dec. 16, 1921   3 Sheets-Sheet 2

NICOLA D. GIGLIOTTI INVENTOR.

BY Richey Slough & Foles

His ATTORNEYS

March 18, 1924.  
N. D. GIGLIOTTI  
1,487,378
MACHINE FOR MAKING NOODLES, MACARONI, AND SPAGHETTI
Filed Dec. 16, 1921     3 Sheets–Sheet 3
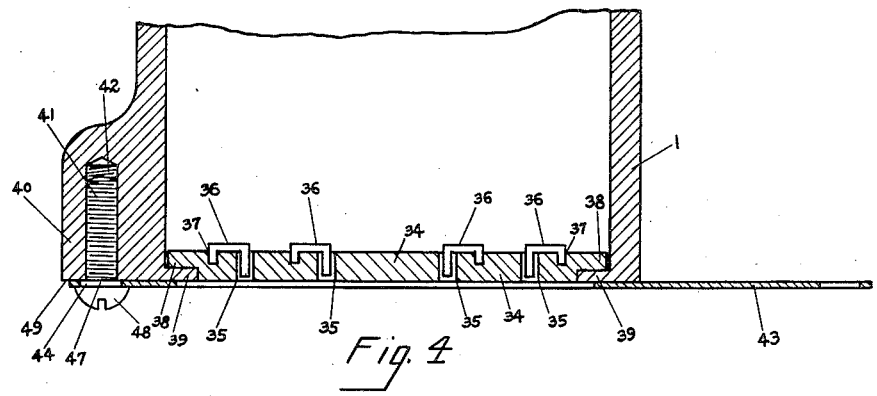
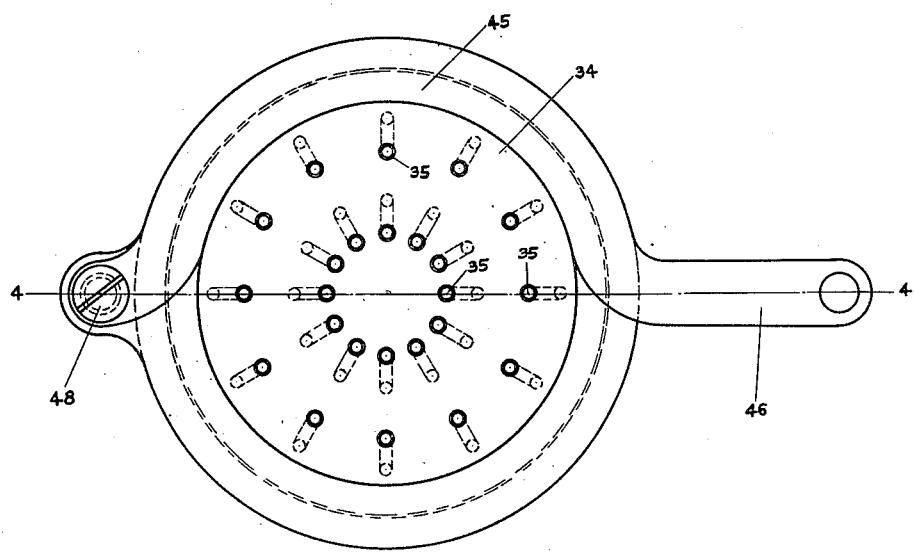
NICOLA D. GIGLIOTTI    INVENTOR.
BY Richey Slough & Fabo.
HIS ATTORNEYS Patented Mar. 18, 1924.

1,487,378

UNITED STATES PATENT OFFICE.

NICOLA D. GIGLIOTTI, OF LORAIN, OHIO.

MACHINE FOR MAKING NOODLES, MACARONI, AND SPAGHETTI.

Application filed December 16, 1921. Serial No. 522,775.

*To all whom it may concern:*

Be it known that I, NICOLA D. GIGLIOTTI, a citizen of the United States, residing at Lorain, in the county of Lorain and State of Ohio, have invented certain new and useful Improvements in Machines for Making Noodles, Macaroni, and Spaghetti, of which the following is a full, clear, concise, and exact description, such as will enable others skilled in the art to which my invention appertains to make and use the same.

My invention relates to machines for making noodles, macaroni and spaghetti, and particularly to machines of such size and character as are best adapted to be used in households rather than machines which are only adapted for use in factories where the product is manufactured in huge quantities.

An object, therefore, of my invention is to produce a machine of the above character which is small in size and which may be readily attached to a table, shelf or bracket, and readily detached therefrom, and which will be capable of being operated by hand with a minimum of labor and without the exercise of considerable skill.

Another object of my invention is to provide such a machine as may be made readily and quickly adaptable for the making of macaroni, spaghetti or noodles which are of different forms.

Another object of my invention is to provide a complete machine which may be taken apart very readily for cleaning and which may be again re-assembled with a minimum of labor and requiring no special care or skill to re-assemble the machine for the making of any of the above products after cleaning.

Another object of my invention is to provide in combination with the other parts of such a machine a cutting knife secured to the machine adjacent to the opening where the product emerges from the machine so as to cut off the noodles or other products to any desired lengths.

Now, my invention consists in the novel features of construction and combination of parts hereinafter described, particularly pointed out in the claim, and shown in the accompanying drawings in which:

Fig. 3 is a bottom plan view thereof with a bottom view of a macaroni making die plate in position in the machine.

Fig. 4 is a sectional view of the lower part of the machine taken on the line 4—4 of Fig. 3, this view also showing in section the macaroni die plate of Fig. 3.

Figure 1:
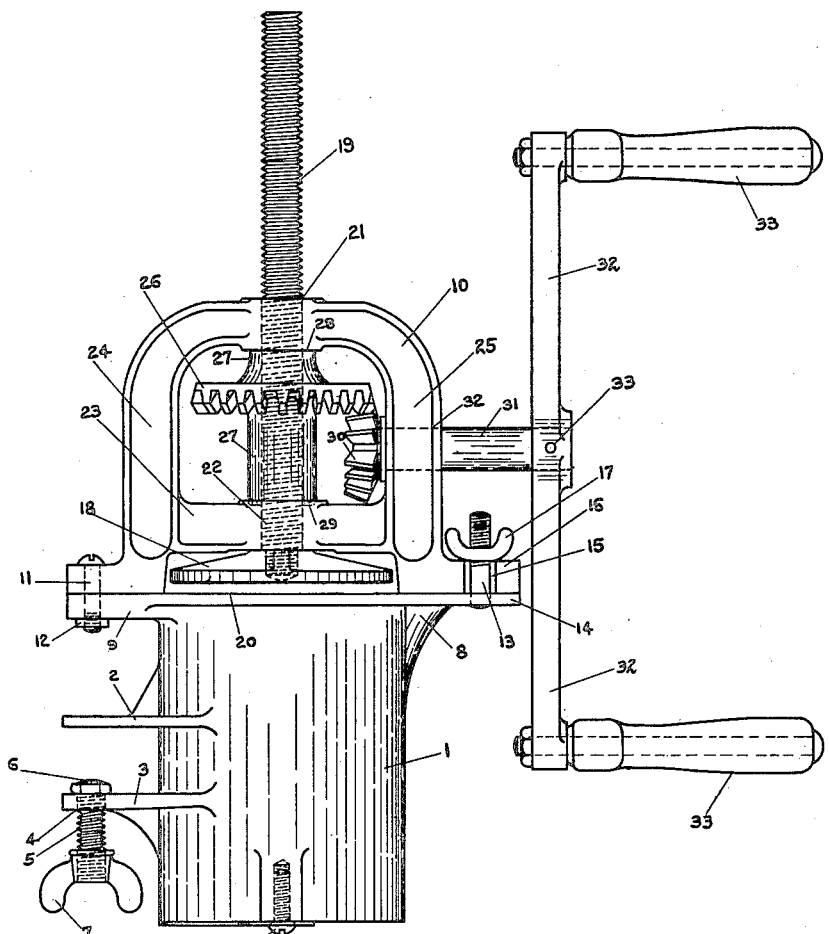
Fig. 1 is a side elevational view of an embodiment of my invention.
Figure 7:
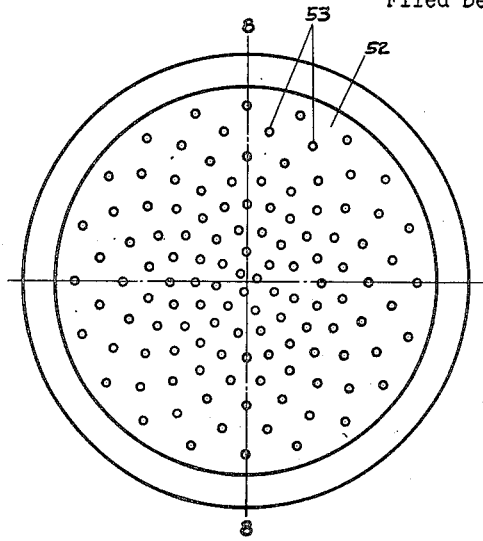
Fig. 7 is a bottom plan view of a spaghetti forming die plate adaptable for use in the machine when making spaghetti.

Referring now to drawings in the different figures of which like parts are designated by like reference characters, at 1 I show a substantially cylindrical shaped dough container having lugs, 2 and 3, suitably spaced as to form co-operating jaws which may embrace a table, shelf or bracket top, the lug, 3, being perforated and the perforations threaded at 4 to admit a threaded wing screw, 5, having an enlarged clamping end, 6, which by turning the winged head, 7, of the screw, may clamp the container, 1, securely to such table, shelf or bracket top, such top being clamped securely between the jaw on the end of the lug, 2, and the enlarged portion 6 of the screw 5. The container, 1, at its upper portion has cast thereto outwardly extending lugs, 8 and 9, whereby a super-frame structure, 10, may be mounted on the top of the container, 1, the said super-structure, 10, being rotatably secured by a bolt, 11, and a nut, 12, on the lug, 9, a threaded stud, 13, being secured on the lug, 8, at a flanged portion, 14, thereof, the said stud, 13, being adapted to be embraced, when the super-structure, 10, is in an operative position on the container, 1, by slot opening, 15, on a flanged portion, 16, of the said super-structure frame.

A wing nut, 17, is adapted to be threaded over the end of the stud, 13, and adapted to clamp securely the portion, 16, of the frame, 10, to the flanged portion, 14, of the container. A ram piston, 18, is carried on the end of a threaded rod, 19, and adaptable, by the operation of mechanism to be described, to enter the cylindrical shaped opening in the top of the container, 1, and to be projected down through the container until it reaches a point nearly to the bottom thereof, the piston thus being reciprocable downwardly, and it is likewise reciprocable upwardly so as to be lifted above the level of the container opening at 20, whenever it is desired that the frame, 10, by the loosening of the wing nut, 17, be capable of swinging on the pivot bolt, 11, so as to expose the opening, 20, of the container, 1, for the purpose of filling the container with a charge of dough or for the purpose of disassembling the same for cleaning after use.

The frame, 10, is provided with a centrally disposed opening, 21, at its top and another opening, 22, in the portion, 23, which is a bridge between the arms, 23 and 25, of the inverted U-shaped super-structure frame, 10, these two openings being in vertical alignment and being of such a size as to permit the threaded rod, 19, which carries the piston, 18, on its lower end, to be reciprocated through the openings.

A ring gear pinion, 26, is mounted between the openings, 21 and 22, and over the threaded rod, 19, the pinion, 26, having a hub portion, 27, which is annular, the inner wall of which contains internal threads adapted to fit with and cooperate with the threads of the threaded rod, 19, which passes through the opening in the hub, 27. Therefore, when the pinion, 26, is rotated about its axis, the internal threads of its hub portion engaging the external threads of the rod, 19, and the hub, 27, being restrained by the abutting surfaces, 28 and 29 of the frame, 10, from moving longitudinally, the rod, 19, will be caused to so move longitudinally in an upward or downward direction depending upon the direction of rotation of the ring gear pinion, 26.

The teeth of the ring gear pinion, 26, are beveled and are adapted to be engaged by beveled teeth of a pinion, 30, mounted on the end of a shaft, 31, journaled at 32 in the arm, 25, of the inverted U-shaped superstructure frame, 10, the shaft, 31, having one or more cranks, 32, rigidly secured at the other end thereof by a pin, 33, the said cranks having handles, 33′, at their far ends; as shown I prefer two cranks, though one only may be used.

Thus, the ring gear, 26, is adapted to be rotated in a counter clock-wise direction looking from above whenever the shaft, 31, is rotated by an operator turning the crank, 32, by its handle, 33, in a clock-wise direction as when viewed by the operator turning the crank. Such counter clock-wise rotation of the ring gear pinion, 26, will cause the reciprocable rod, 19, which is threaded into the interior of the hub, 27, of the gear, 26, to travel downwardly, and the piston, 18, carried on its lower end will be forced downwardly through the cylindrical opening, 20, of the container, 1, and through the container, 1, until it reaches a point nearly to the bottom thereof.

It being assumed that previous to such operation a charge of dough was placed in the container and a macaroni forming die plate such as the die plate 34 of Figs. 3 and 4 were placed in the bottom of the container, such operation would force the dough through the opening, 35, in the said die plate. The dough will then be expressed through the said openings because of the presence of the U-shaped pins, 36, which have an arm, 37, secured rigidly in the die plate, 34, and the other arm passing mostly through the opening, 35, will cause the dough to emerge from the die plate at the bottom side thereof as hollow tubes, the walls of the openings, 35, determining their diameter, and the diameter of the pins, 36, determining the diameter of the interior opening of the tubular macaroni.

It will be noted that the die plate, 34, has a peripherally flanged portion, 38, which overlies an inwardly extending flange, 39, on the bottom edge of the wall of the container 1.

The container, 1, also contains a lug, 40, adapted to receive a screw, 41, the lug having an internally threaded opening 42, for the reception of the screw, 41. A knife, 43, having an opening, 44, at one end and having an intermediate curved blade portion, 45, and a handle portion, 46, is pivoted on the screw, 44, at a shoulder, 47, thereon, the said knife being adapted to rotate on the said shoulder between the head, 48, of the screw and the surface, 49 of the lug, 40. When in normal position as shown in Fig. 3, the knife blade, 45, is out of the way of the opening, 35, but whenever it is desired to cut off the tubular macaroni emerging from the opening, 35, the operator manipulates the handle 46, so as to draw the cutting inner edge of the blade, 45, across the outside ends of the opening, 35, the cutting action being a shearing action. I also preferably make the outer convex edge a cutting edge, to cause cutting on the return stroke.

Figure 5:
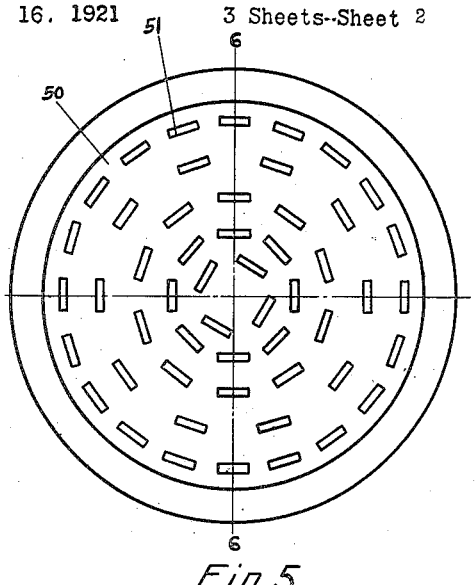
Fig. 5 is a bottom plan view of a die plate adaptable for use in the machine when it is desired to make flattened noodles therein.
Figure 8:
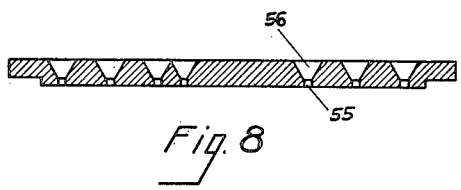
Fig. 8 is a section of the die plate of Fig. 7 taken on the line 8—8 of Fig. 7.
Figure 6:
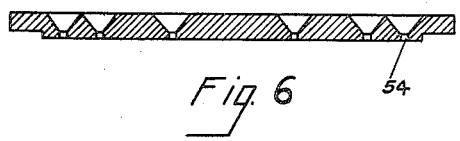
Fig. 6 is a sectional view taken on the line 6—6 of Fig. 5.
Figure 2:
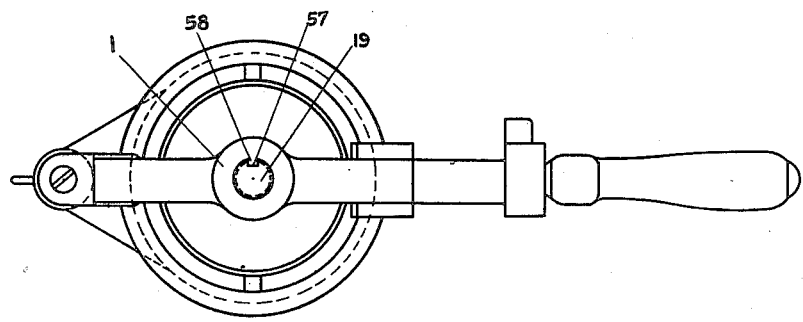
Fig. 2 is a top plan view thereof.

Whenever it is desired to make flat noodles, a die plate, 50, Figs. 5 and 6, is used, and such die plate has flat openings, 51, rather than the annular openings, 35, of the plate, 34.

Whenever it is desired to make solid, circular noodles such as spaghetti, a die plate such as the plate, 52, and containing small openings, 53, is provided, the plates, 50 and 52, being also flanged as is the plate, 34, for fitting within the container, 1, and on the flange, 19, thereof. It will be noted also that in the case of the plates, 50 and 52, for the making of noodles and spaghetti, that the said openings have a tapered approach portion, 52 and 55, and which approach portions are larger at the start than at the openings where the dough emerges from the plates. It will be noted also that I so construct the openings of the plate, 52, for making spaghetti with the approach portion frusto-conical in shape, and with the opening portion, 56, short, but substantially cylindrical. I have found that such shaping of the openings and the approach portions thereof is conducive to the best results.

It will be noted also that the rod, 19, threaded in the hub, 27, of the ring gear, 26, has a longitudinally extending slot, 57, and that a keying projection, 58, of the frame 10, within the openings, 21 and 22, extends within the slot, 57, and that the threaded rod, 19, is thereby prevented from rotating about its longitudinal axis, and that therefore, the only motion which it is capable of is a reciprocatory motion.

Having thus described my invention in a specific embodiment thereof, I am aware that numerous and extensive departures may be made from the said embodiment herein illustrated and described, but without departing from the spirit of my invention.

I claim:

In a household machine for making noodles, macaroni, spaghetti and the like, the combination with a cylinder of a piston reciprocable therein, an apertured die-plate at one end of the cylinder, motion reducing gear mechanism to effect reciprocation of the piston, a bracket clamp secured to a side of the cylinder to clamp the cylinder to a supporting board, a horizontal rotatable shaft adapted when rotated to drive said mechanism against the resistance of dough placed in the cylinder and pressed by the piston through the die-plate apertures, a pair of cranks, secured to the shaft to rotate it, handles therefor disposed on opposite sides of the shaft, said handles being simultaneously manually revoluble about the shaft to reciprocate the piston, the stresses incidental to such operation being thereby substantially balanced without placing undue strain upon said clamp and board connection.

In witness whereof, I have hereunto signed my name this 5th day of December, 1921.

NICOLA D. GIGLIOTTI.